United States Patent Office 2,854,471
Patented Sept. 30, 1958

2,854,471

6 - HALOACYL - 1,4a - DIMETHYL - 7 - ISOPROPYL 1,2,3,4,4a,9,10,10a-OCTAHYDROPHENANTHRENE - 1 - CARBONITRILES

Willard M. Hoehn, Wilmette, Ill., assignor to G. D. Searle & Co., Chicago, Ill., a corporation of Delaware No Drawing. Application December 24, 1956
Serial No. 630,065

7 Claims. (Cl. 260—464)

The present invention is concerned with a new class of phenanthrene carbonitriles, and more specifically, with haloacyl substitution products of 1,4a-dimethyl-7-isopropyl - 1,2,3,4,4a,9,10,10a-octahydrophenanthrene-1-carbonitrile. The compounds of this invention can be represented by the structural formula

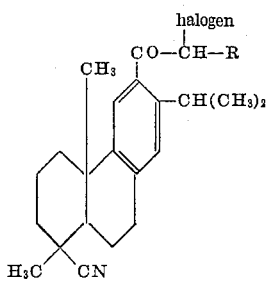

wherein R can represent hydrogen or a lower alkyl radical. Among the lower alkyl radicals which R can represent are methyl, ethyl, propyl, butyl, amyl, hexyl, and branched-chain isomers thereof.

A satisfactory starting material for the manufacture of compounds of this invention is the dehydrogenated rosin nitrile prepared by reacting dehydrogenated rosin with ammonia at an elevated temperature and removing the water from the reaction mixture as it is formed, for example, according to the processes disclosed in U. S. 2,534,297 to Putnam. The product obtained from dehydrogenated rosin by the methods of the aforementioned patent is crude dehydroabietonitrile, which can be crystallized to give purified dehydroabietonitrile, or 1,4a-dimethyl - 7 - isopropyl - 1,2,3,4,4a,9,10,10a-octahydrophenanthrene-1-carbonitrile, as disclosed therein.

1,4a - dimethyl - 7-isopropyl-1,2,3,4,4a,9,10,10a-octahydrophenanthrene - 1 - carbonitrile (dehydroabietonitrile) undergoes Friedel-Crafts reactions with acyl halides to yield 6-acyl substitution products. For example, the aluminum chloride-catalyzed reaction of 1,4a-dimethyl-7 - isopropyl-1,2,3,4,4a,9,10,10a-octahydrophenanthrene-1-carbonitrile with acetyl chloride affords 1,4a-dimethyl-6 - acetyl - 7-isopropyl-1,2,3,4,4a,9,10,10a-octahydrophenanthrene-1-carbonitrile. Other 6-acyl substitution products are conveniently obtained by replacement of the acetyl chloride with the appropriate acyl chloride or bromide, the reaction with butyryl chloride, for example, yielding the 6-butyryl substitution product. These 6-acyl substitution products of 1,4a-dimethyl-7-isopropyl-1,2,3,4 4a,9,10,10a-octahydrophenanthrene-1-carbonitrile can be halogenated in the acyl substituent at the position α to the carbonyl group to yield the halogenated derivatives of the present invention.

The same halogenated acyl derivatives can be prepared by an alternate route which requires only a single step from dehydroabietonitrile. This is achieved by conducting a Friedel-Crafts reaction of dehydroabietonitrile with an α-haloacyl halide such as chloroacetyl chloride or α-bromopropionyl chloride, whereby the 6-haloacyl derivative (in these instances the chloroacetyl derivative or the α-bromopropionyl derivative) results directly.

The preferred method of preparing iodinated derivatives such as 1,4a-dimethyl-6-iodoacetyl-7-isopropyl-1,2,3 4,4a,9,10,10a - octahydrophenanthrene-1-carbonitrile consists of reacting the corresponding 6-chloroacyl or 6-bromoacyl derivative with an alkali metal iodide in an acetone or butanone suspension.

The halogenated compounds of the present invention are useful cardiac depressants. They also display hormonal and anti-hormonal properties. For example, they are anabolic agents useful in promoting protein metabolism, while also being capable of inhibiting masculinizing effects of testosterone. In addition, these halogenated derivatives are important intermediates in the synthesis of another class of therapeutic agents, the 6-acyloxyacyl and 6-hydroxyacyl derivatives of 1,4a-dimethyl-7-isopropyl - 1,2,3,4,4a,9,10,10a-octahydrophenanthrene-1-carbonitrile, as disclosed more fully in copending application Serial No. 494,235, filed March 14, 1955, now U. S. Patent No. 2,781,394, of which this is a continuation-in-part.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.), pressures in millimeters (mm.) of mercury and quantities of materials in parts by weight.

Example 1

With efficient stirring, 95 parts of aluminum chloride is added to a solution of 100 parts of 1,4a-dimethyl-7-isopropyl-1,2,3,4,4a,9,10,10a - octahydrophenanthrene-1-carbonitrile and 31 parts of acetyl chloride in 425 parts of nitrobenzene maintained at about −5 to +8° C. The reaction mixture is stirred for an additional 3 hours and kept under refrigeration for 2–3 days. The mixture is then poured on about 500 parts of ice, and sufficient ether is added to cause the density of the organic phase to become less than the density of the aqueous phase. The organic phase is separated and washed with a total of 600 parts of water in two portions, a total of 600 parts of 2% sodium hydroxide solution in two portions and then with several portions of water. The ethereal solution is dried over sodium sulfate, filtered, and concentrated on a steam bath and finally by a vacuum distillation at about 90–100° C. and a pressure of 15 mm. in order to remove the ether and nitrobenzene. A solution of the residue in chloroform is treated with activated charcoal, filtered and diluted with methanol. The precipitated product, 1,4a-dimethyl-6-acetyl-7-isopropyl - 1,2,3,4,4a,9,10,10a-octahydrophenanthrene-1-carbonitrile is collected on a filter. An additional quantity of this product is obtained by concentration of the mother liquor. This compound melts at 156–158° C. and has the following structural formula

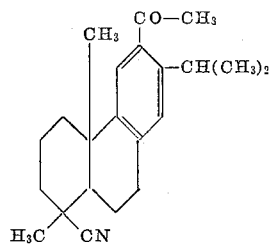

Example 2

A stirred solution of 8.65 parts of 1,4a-dimethyl-6- acetyl-7-isopropyl - 1,2,3,4,4a,9,10,10a - octahydrophenanthrene-1-carbonitrile in 180 parts of ether is treated by the gradual addition of 4.5 parts of bromine. After about an hour the mixture is extracted with 200 parts of water. The ethereal layer is separated and washed with two portions of 100 parts each of 2% sodium hydroxide solution and then with several portions of water. All aqueous washings are discarded. The organic phase is dried over sodium sulfate, filtered, and concentrated in a vacuum. A solution of the residue in a small amount of ether is diluted with warm methanol and cooled, whereupon purified 1,4a-dimethyl-6-bromoacetyl-7-isopropyl-1,2,3,4,4a,9,10,10a - octahydrophenanthrene - 1 - carbonitrile separates from the solution. This product is collected on a filter and washed with methanol. It melts at about 103–104.5° C. and has the following structural formula

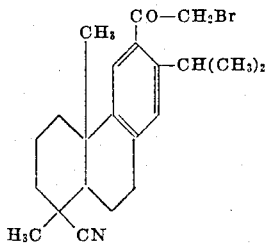

*Example 3*

Aluminum chloride (95 parts) is gradually added to a solution of 100 parts of 1,4a-dimethyl-7-isopropyl-1,2,3,4,4a,9,10,10a-octahydrophenanthrene-1-carbonitrile and 40.5 parts of chloroacetyl chloride in 725 parts of nitrobenzene. The reaction mixture is maintained at 0–3° C. and is stirred during the aluminum chloride addition and for 1 hour thereafter. The reaction vessel is protected from atmospheric moisture with a drying tube and is kept under refrigeration for 24 hours at about 5° C. The mixture is poured onto 600 parts of ice, and 1100 parts of ether is added. The mixture is stirred and then allowed to stand until the layers separate. The organic phase is washed with 1000 parts of water, then with 1000 parts of 2% sodium hydroxide solution and finally with a total of 2000 parts of water in two portions. All aqueous washings are discarded. The ethereal solution is dried over sodium sulfate, filtered and concentrated in a vacuum. The residue is dissolved by digesting it for 15 minutes with 130 parts of refluxing petroleum ether. The crystalline material obtained when this solution is allowed to cool and stand is recrystallized from a mixture of methanol and chloroform. This product is 1,4a-dimethyl-6-chloroacetyl-7-isopropyl - 1,2,3,4,4a,9,10,10a-octahydrophenanthrene-1-carbonitrile of melting point 145–146° C. It has the following structural formula

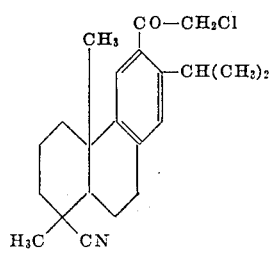

*Example 4*

By the procedure of Example 3, with the substitution of 45.5 parts of α-chloropropionyl chloride for the chloroacetyl chloride, the compound obtained is 1,4α-dimethyl-6-(α-chloropropionyl)-7 - isopropyl - 1,2,3,4,4a,9,10,10a-octahydrophenanthrene-1-carbonitrile. This compound has an ultraviolet absorption maximum at about 259 millimicrons with a molecular extinction coefficient of about 8100. It has the structural formula

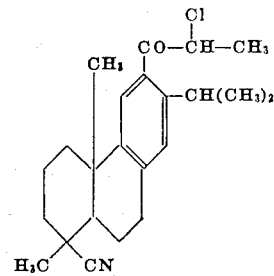

*Example 5*

A mixture of 40 parts of 1,4a-dimethyl-6-chloroacetyl-7-isopropyl - 1,2,3,4,4a,9,10,10a - octahydrophenanthrene-1-carbonitrile, 160 parts of acetone and 40 parts of sodium iodide is allowed to stand at room temperature for 24 hours with periodic shaking. The reaction mixture is then diluted with several times its volume of ether and washed with water, with 2 portions of 1% sodium thiosulfate solution and finally with several additional portions of water. The organic phase is dried over anhydrous sodium sulfate, filtered and concentrated to dryness, yielding a residue of crude 1,4a - dimethyl-6-iodoacetyl-7-isopropyl-1,2,3,4,4a,-9,10,10a - octahydrophenanthrene - 1 - carbonitrile. This compound has the following structural formula

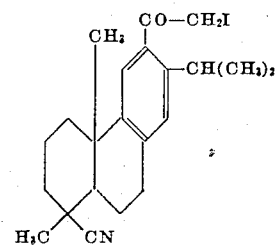

*Example 6*

A solution is prepared by dissolving 112 parts of 1,4a-dimethyl-7-isopropyl-1,2,3,4,4a,9,10,10a - octahydrophenanthrene-1-carbonitrile and 66 parts of butyryl chloride in a mixture of 90 parts of nitrobenzene and 470 parts of chlorobenzene. This solution is chilled with an external ice bath, following which 106 parts of aluminum chloride is added in portions at such a rate that the temperature of the reaction mixture is maintained at about 0–10° C. Efficient stirring is carried out during this operation, and is continued for 3 hours thereafter. The reaction mixture is then allowed to stand at about 25° C. for an additional 18 hours, after which it is poured onto 500 parts of crushed ice. Ether (700 parts) is added, and after thorough mixing, and melting of the ice, the organic phase is separated and combined with an ethereal extract of the aqueous phase. The ethereal extract is washed with water, with 5% sodium hydroxide solution, and finally with several portions of water, after which it is distilled with steam until the organic solvents, including substantially all of the nitrobenzene and chlorobenzene, are removed. The aqueous suspension which remains in the distillation vessel is extracted with ether, and the ethereal solution is rendered anhydrous and subjected to a fractional distillation. A distillate of the desired product, amounting to about 104 parts, is obtained at a boiling point of about 210–215° C. (bath temperature about 225–230° C.) at 0.3–0.5 mm. Upon crystallization and recrystallization from methanol this distillate is converted into purified 1,4a-dimethyl-6-butyryl-7-isopropyl-1,2,3,4,-

4a,9,10,10a-octahydrophenanthrene-1-carbonitrile which melts at about 113–114° C. The structural formula is

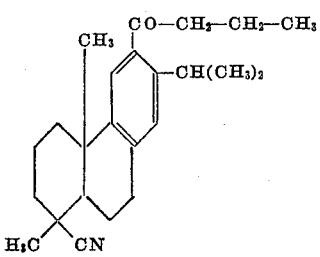

Example 7

A stirred solution of 7 parts of 1,4a-dimethyl-6-butyryl-7-isopropyl - 1,2,3,4,4a,9,10,10a - octahydrophenanthrene-1-carbonitrile in 70 parts of anhydrous ether is treated with 0.05 part of aluminum chloride and then with a total of 3.2 parts of bromine added gradually and in small portions. Stirring is continued for 10 minutes after all of the bromine has been added, following which the ether is removed by vaporization, as by warming. Crystallization of the residue is induced by such means as adding methanol and rubbing the walls of the reaction vessel with a glass rod. The crystalline material is collected and recrystallized from a mixture of methylene chloride and methanol. The product thus obtained is 1,4a-dimethyl-6-(α-bromobutyryl)-7-isopropyl-1,2,3,4,4a,9,10,10a - octahydrophenanthrene-1-carbonitrile which melts at about 117–118° C. and has the structural formula

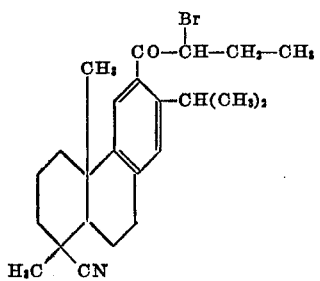

Example 8

A solution of 10 parts of 1,4a-dimethyl-6-butyryl-7-isopropyl-1,2,3,4,4a,9,10,10a-octahydrophenanthrene-1 - carbonitrile in 40 parts of dimethylformamide is stirred for 2 hours with a solution of 4.55 parts of bromine in 25 parts of dimethylformamide and the mixture is then allowed to stand at room temperature for 4 days. When the reaction mixture is diluted with water, 1,4a-dimethyl-6-(α-bromobutyryl)-7-isopropyl-1,2,3,4,4a,9,10,10a - octahydrophenanthrene-1-carbonitrile precipitates from solution. When this product is collected and crystallized from mixtures of methylene chloride and methanol, there is obtained the purified compound identical with the product of Example 7.

Example 9

To a solution of 5 parts of 1,4a-dimethyl-6-(α-bromobutyryl) - 7 - isopropyl - 1,2,3,4,4a,9,10,10a - octahydrophenanthrene-1-carbonitrile in 120 parts of acetone there is added 5 parts of sodium iodide. Efficient stirring is employed and continued while the reaction mixture is maintained at about 25° C. for 30 minutes. The insoluble inorganic salt is then removed by filtration, and the filtrate is diluted with water, with chilling and vigorous stirring, until separation of the insoluble product appears complete. This product is collected and recrystallized from a mixture of methylene chloride and methanol, whereupon there is obtained 1,4a-dimethyl-6 - (α - iodobutyryl) - 7 - isopropyl - 1,2,3,4,4a,9,10,10a- octahydrophenanthrene - 1 - carbonitrile which melts at about 152–154° C. and has the structural formula

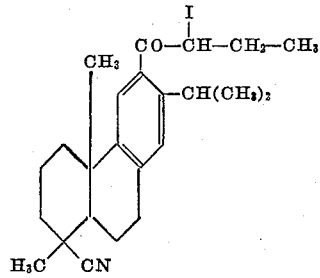

What is claimed is:
1. A compound of the structural formula

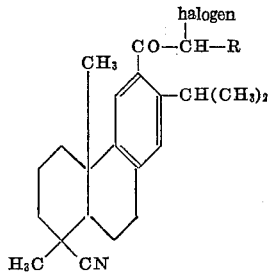

wherein R is a member of the group consisting of hydrogen and lower alkyl radicals and the halogen atom is a halogen atom of atomic number greater than 9.

2. A compound of the structural formula

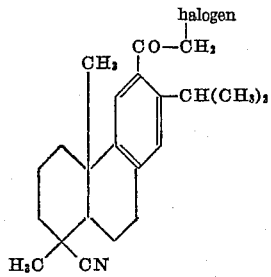

wherein the halogen atom is a halogen atom of atomic number greater than 9.

3. 1,4a - dimethyl - 6 - chloroacetyl - 7 - isopropyl-1,2,3,4,4a,9,10,10a - octahydrophenanthrene - 1 - carbonitrile.

4. 1,4a - dimethyl - 6 - bromoacetyl - 7 - isopropyl-1,2,3,4,4a,9,10,10a - octahydrophenanthrene - 1 - carbonitrile.

5. A compound of the structural formula

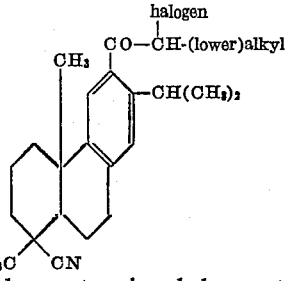

wherein the halogen atom is a halogen atom of atomic number greater than 9.

6. 1,4a - dimethyl - 6 - (α - bromobutyryl) - 7 - isopropyl - 1,2,3,4,4a,9,10,10a - octahydrophenanthrene - 1-carbonitrile.

7. 1,4a - dimethyl - 6 - (α - iodobutyryl) - 7 - isopropyl - 1,2,3,4,4a,9,10,10a - octahydrophenanthrene - 1-carbonitrile.

References Cited in the file of this patent

Le-Van-Thoi et al., Industrie plastiques Mod. (Paris), vol. 6, No. 3, pp. 90–92 (March 1954).